Feb. 14, 1933.    J. E. WILSON ET AL    1,897,920
SWIVEL HOOK
Filed May 9, 1932
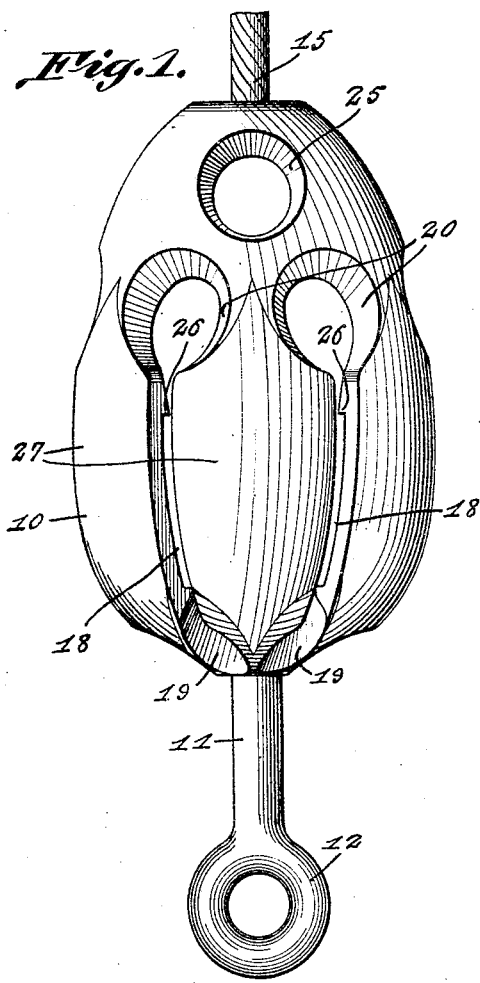
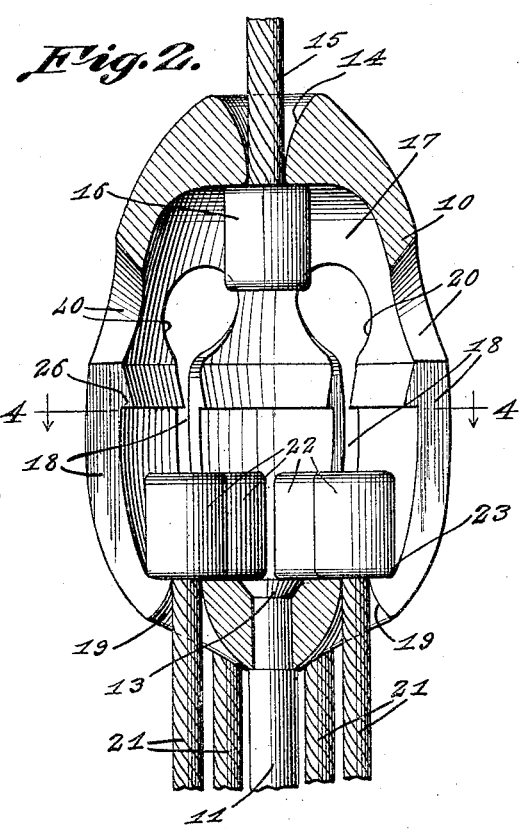
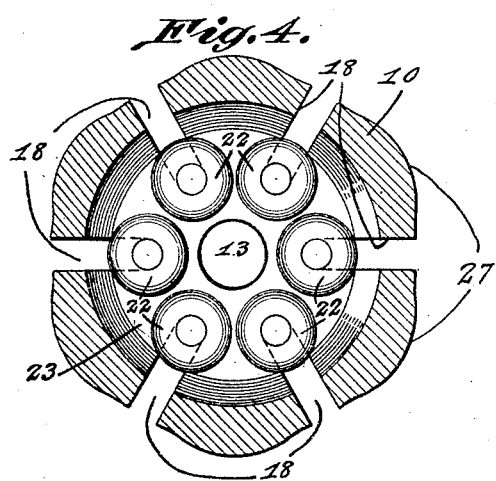
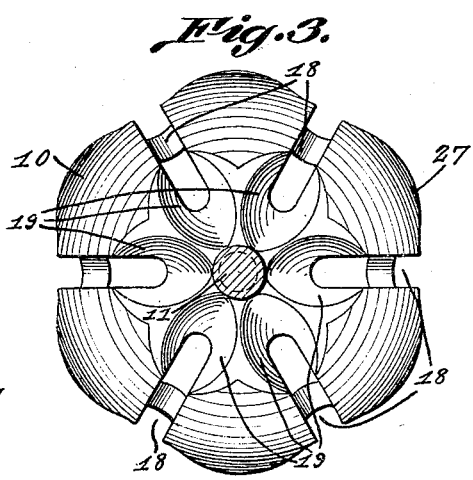
J. E. Wilson
I. R. Wilson, INVENTORS
BY Victor J. Evans & Co.
ATTORNEY Patented Feb. 14, 1933

1,897,920

UNITED STATES PATENT OFFICE

JOHN E. WILSON AND IVOR R. WILSON, OF McEWEN, OREGON

SWIVEL HOOK

Application filed May 9, 1932. Serial No. 610,270.

The invention relates to a swivel hook and more especially to a bull hook of the cage swivel type.

The primary object of the invention is the provision of a hook of this character, wherein a plurality of choker lines may be engaged or disengaged therewith with dispatch and when engaged the same will not be twisted nor distorted so that one will chase the other in the use of the hook, the hook being designed especially for use in logging.

Another object of the invention is the provision of a hook of this character, wherein the cage for the choker lines is of novel form so that in the use it will be impossible for the choker lines to become free and at the same time one line will not interfere with the other, the choker lines being self-adjusting.

A further object of the invention is the provision of a hook of this character, which is extremely simple in construction, reliable and efficient in its operation, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiments of the invention, and pointed out in the claims hereunto appended.

In the accompanying drawing:—

Figure 1 is a side elevation of a cage swivel hook constructed in accordance with the invention.

Figure 2 is a vertical longitudinal sectional view therethrough.

Figure 3 is a bottom plan.

Figure 4 is a sectional view on the line 4—4 of Figure 2 looking in the direction of the arrows.

Similar reference characters indicate corresponding parts throughout the several views in the drawing.

Referring to the drawing in detail, the improved butt or bull hook is adapted for use in the handling of logs and comprises a substantially pear-shaped hollow body or block 10 preferably made from metal cast or otherwise formed and in one end of this body or block is mounted a swivel pin 11 having an eye 12, the swivel end 13 of the pin being centrally of said body or block. The opposite end of the body or block is formed with an inverted frustro-conical hole or opening 14 through which passes a line 15 having a knob-like end 16, the latter being within the chamber 17 formed by the body or block 10 and abuts the marginal edge of the opening or hole 14, this line 15 constituting the center line of the hook.

Formed in the body 10 an equidistance apart is a series of slots 18, these extending to one end of the body 10 having mounted therein the pin 11 and terminating in outwardly flared enlarged apertures 19 concentrically disposed with respect to the eye 12 but slightly removed therefrom while at the other ends of the said slots 18 are inwardly beveled entrance apertures 20, the slots 18 between said apertures 19 and 20 being relatively narrow and constitute passages for choker lines 21 having the knob-like ends 22, these being adapted to freely pass through the entrance apertures 20 for the admission of the choker lines 21 to the slot 18 and in this fashion the said choker lines 21 can be coupled to the body 10 as is clearly exhibited in Figure 2 of the drawing. The chamber 17 within the body 10 houses the knob-like ends 16 and 22 and above the center line 15 and the choker lines 21 are free for swivel movement in their connection with the body 10, while the knob-like ends 16 and 22 retain their connection with said body. The choker lines 21 can be readily detached or uncoupled from the body 10 through the slots 18 and the entrance apertures 20 as should be obvious.

The end of the body 10 carrying the pin 11 is formed with an inner bearing surface 23 for the knob-like ends 22 of the choker lines 21. The choker lines 21 are used as hollow cables for the handling of logs, the outer ends of the said lines being adapted to embrace logs in the usual manner and the manner of embracing such logs being not shown. The body 10 of the hook is provided with an opening 25 which permits the introduction of a line, in event of emergency by the breaking of the center line 15.

Internally of the body 10 immediately below the entrance apertures 20 is a shoulder 26 which functions to prevent the ferrule from slipping out of each slot 18, this shoulder being disposed circumferentially of the body.

Formed externally of the body 10 midway between the slots 18 and longitudinally disposed thereon are ribs 27, these being flared at both ends and the purpose thereof is to reinforce or strengthen the cage swivel hook.

What is claimed is:—

1. A hook of the kind described comprising a hollow substantially pear-shaped body having spaced longitudinally disposed slots extending close to the center of one end of the body and their opposite ends terminating considerably removed from the other end of the body with enlarged rounded entrances, the ends of the slots close to one end of the body being outwardly flared, said body being provided with apertures in opposite ends, a swiveled eye in one aperture, the other aperture being adapted to receive a center line and said flared ends of the slots being adapted to receive choke lines having knot-like ends positioned within the body.

2. A hook of the kind described comprising a hollow substantially pear-shaped body having spaced longitudinally disposed slots extending close to the center of one end of the body and their opposite ends terminating considerably removed from the other end of the body with enlarged rounded entrances, the ends of the slots close to one end of the body being outwardly flared, said body being provided with apertures in opposite ends, a swiveled eye in one aperture, the other aperture being adapted to receive a center line and said flared ends of the slots being adapted to receive choke lines having knot-like ends positioned within the body and bulges on the body externally thereof between said slots.

In testimony whereof we affix our signatures.

JOHN E. WILSON.
IVOR R. WILSON.